United States Patent [19]

Chen

[11] Patent Number: 4,801,387

[45] Date of Patent: * Jan. 31, 1989

[54] WATER TREATMENT POLYMERS AND METHODS OF USE THEREOF

[75] Inventor: Fu Chen, Newtown, Pa.

[73] Assignee: Betz Laboratories, Inc., Trevose, Pa.

[*] Notice: The portion of the term of this patent subsequent to Dec. 24, 2002 has been disclaimed.

[21] Appl. No.: 37,755

[22] Filed: Apr. 13, 1987

Related U.S. Application Data

[63] Continuation of Ser. No. 861,785, May 9, 1986, Pat. No. 4,659,482, which is a continuation-in-part of Ser. No. 545,563, Oct. 26, 1983, abandoned.

[51] Int. Cl.$^4$ .................................................. C02F 5/14
[52] U.S. Cl. .................................. 210/699; 210/701; 252/181; 252/395; 422/15; 422/16; 422/17; 422/19
[58] Field of Search .............................. 210/698–701; 252/180, 181, 389.2, 389.24, 389.52, 395; 422/15, 17, 19, 16

[56] References Cited

U.S. PATENT DOCUMENTS

| | | | |
|---|---|---|---|
| 2,634,296 | 4/1953 | Morris et al. | 568/648 |
| 2,723,971 | 11/1955 | Cupery | 525/60 |
| 2,847,477 | 8/1958 | Watanabe et al. | 568/626 |
| 2,847,478 | 8/1958 | Hwa et al. | 568/626 |
| 3,228,979 | 1/1966 | Gaertner | 260/512 R |
| 3,706,717 | 12/1972 | Siegle | 210/701 |
| 4,029,577 | 6/1977 | Godlewski et al. | 210/701 |
| 4,095,029 | 6/1978 | Fields | 252/395 |
| 4,209,398 | 6/1980 | Ii et al. | 252/389.2 |
| 4,303,568 | 12/1981 | May et al. | 252/389.2 |
| 4,469,615 | 9/1984 | Tsuruoka et al. | 252/181 |
| 4,500,693 | 2/1985 | Takehara et al. | 526/240 |
| 4,560,481 | 12/1985 | Hollander | 422/17 |
| 4,659,482 | 4/1987 | Chen | 210/699 |

FOREIGN PATENT DOCUMENTS

| | | | |
|---|---|---|---|
| 56-155692 | 12/1981 | Japan | 210/698 |
| 58-9987 | 1/1983 | Japan . | |
| 58-7415 | 1/1983 | Japan . | |
| 1491701 | 11/1977 | United Kingdom . | |

OTHER PUBLICATIONS

*Chemical Abstract*, 85:20537p, "Reaction of Unsaturated Alcohols and Their Derivatives With Sultones, 1976.
"Cops I, Copolymerizable Surfactant", Alcolac, Technical Literature, Baltimore, Md.

*Primary Examiner*—Peter Hruskoci
*Attorney, Agent, or Firm*—Alexander D. Ricci

[57] ABSTRACT

A water soluble polymer composition is disclosed. The polymer has repeat units characterized by the structural formula:

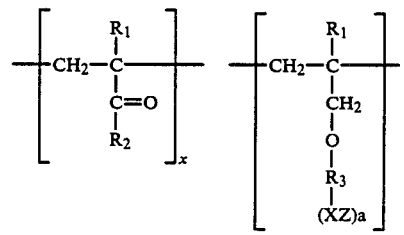

wherein $R_1$ is H or lower alkyl ($C_1$–$C_3$); $R_2$ is OH, OM, or NH$_2$; M is a water soluble cation; $R_3$ is a hydroxy substituted alkyl or alkylene radical having from 1 to about 6 carbon atoms or a non-substituted alkyl or alkylene radical having from 1 to 6 carbon atoms; X is an anionic radical; Z is H or hydrogens or a water soluble cation or cations which together counterbalance the valence of X, and a is 0 or 1. The copolymer is effective in inhibiting the precipitation of certain scale forming salts, and also acts to inhibit corrosion of metal parts in contact with water systems.

6 Claims, No Drawings

WATER TREATMENT POLYMERS AND METHODS OF USE THEREOF

CROSS REFERENCE TO RELATED APPLICATIONS

This is a continuation of applicaiton Ser. No. 861,785, filed on May 9, 1986, now U.S. Pat. No. 4,659,482, which is a continuation-in-part of Ser. No. 545,563, filed Oct. 26, 1983, now abandoned.

FIELD OF THE INVENTION

The present invention pertains to a composition and method of utilization of same to inhibit corrosion and control the formation and deposition of scale imparting compounds in water systems such as cooling, boiler and gas scrubbing systems.

BACKGROUND OF THE INVENTION

The problems of corrosion and scale formation and attendant effects have troubled water systems for years. For instance, scale tends to accumulate on internal walls of various water systems, such as boiler and cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an accumulation of these scale imparting compounds along or around the metal surfaces which contact the flowing water circulating through the system. In this manner, heat transfer functions of the particular system are severely impeded.

Corrosion, on the other hand, is a degradative electrochemical reaction of a metal with its environment. Simply stated, it is the reversion of refined metals to their natural state. For example, iron ore is iron oxide. Iron oxide is refined into steel. When the steel corrodes, it forms iron oxide which, if unattended, may result in failure or destruction of the metal, causing the particular water system to be shut down until the necessary repairs can be made.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, Pa. Pages 85–96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness-imparting ions escape the treatment, and eventually are introduced into the steam generating system.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their resultant deposition. The carbonates of magnesium and calcium are not the only problem compounds as regards scale, but also waters having high contents of phosphate, sulfate and silicate ions either occurring naturally or added for other purposes cause problems since calcium and magnesium, and any iron or copper present, react with each and deposit as boiler scale. As is obvious, the deposition of scale on the structural parts of a steam generating system causes poorer circulation and lower heat transfer capacity, resulting accordingly in an overall loss in efficiency.

DETAILED DESCRIPTION OF THE INVENTION

In accordance with the invention, it has been surprisingly discovered that water soluble copolymers, as shown in Formula I hereinafter, are effective in controlling the formation of mineral deposits and in inhibiting corrosion in various water systems.

The water soluble copolymers of the invention have the structure:

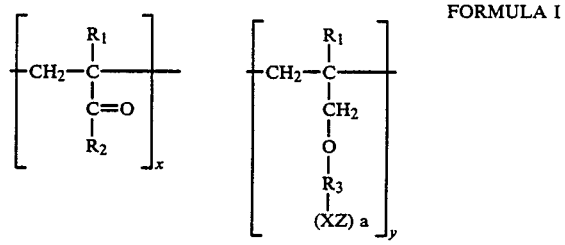

FORMULA I wherein $R_1$ is H or lower alkyl ($C_1$–$C_3$); $R_2$ is OH or OM, or $NH_2$; M is a water soluble cation; $R_3$ is a hydroxy substituted alkyl or alkylene radical having from 1 to 6 carbon atoms or a non-substituted alkyl or alkylene radical having from 1 to about 6 carbon atoms; X, when presett, is an anionic radical selected from the group consisting of $SO_3$, $PO_3$, $PO_4$, and COO; Z, when present, is H or hydrogens or any water soluble cation or cations which together counterbalance the valence of the anionic radical; a is 0 or 1.

The number average molecular weight of the water soluble copolymers of FORMULA I may fall within the range of 1,000 to 1,000,000. Preferably the number average molecular weight will be within the range of from about 1,500 to 500,000, with the range of about 1,500 to about 10,000 being even more highly desirable. The key criterion is that the polymer be water soluble.

The molar ratio x:y of the monomers of FORMULA I may fall within the range of between about 30:1 to 1:20, with the x:y molar ratio range of from about 10:1 to 1:5 being preferred.

At present, the water soluble polymer preferred for use in cooling water systems is:

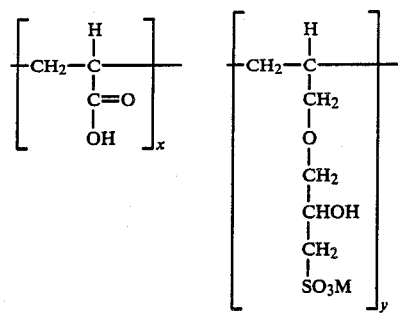

FORMULA II wherein M is the same as given in FORMULA I. This polymer (FORMULA II) is referred to as acrylic acid-/allyl hydroxy propyl sulfonate ether (AA/AHPSE). The IUPAC nomenclature for AHPSE is 1-propane sulfonic acid, 2-hydroxy-3-(2-propenyl oxy)-mono sodium salt. Heretofore, the AHPSE monomer has been used in the emulsion polymerization of acrylate esters, vinyl acetate and styrene for the manufacture of latex paints. However, to my knowledge, my invention involves the first time this monomer has been polymerized into a water soluble polymer under aqueous solution polymerization techniques.

With respect to both repeat units of the polymers of the present invention, they may exist in acid or water soluble salt form when used in the desired water system.

As to preparation of the monomer designated as x above, in FORMULA I, acrylic acid is well known. It may be produced by hydrolysis of acrylonitrile or via oxidation of acrolein. Other well known vinyl containing monomers such as methacrylic acid and acrylamide may also be utilized as monomer x of FORMULA I in accordance with the invention.

Turning to the allyl containing monomer, monomer y, in the FORMULA I above, these may be produced by reacting allyl alcohol with a non-tertiary alcohol in the temperature range of about 25°-150° C. as is detailed in U.S. Pat. No. 2,847,477 (the entire disclosure of which is hereby incorporated by reference) followed by, if desired, sulfonation, phosphorylation, phosphonation or carboxylation of the monomer via well-known techniques.

The preferred allyl hydroxy propyl sulfonate ether monomers (monomer y FORMULA II) may conveniently be prepared via a ring opening reaction of the epoxy group of an allyl glycidyl ether precursor. Sulfonation of the epoxy group with sodium sulfite in the presence of a phase transfer catalyst such as tetra-n-butylammonium bisulfite or with fuming sulfuric acid containing sulfur trioxide will produce the sulfonic acid group and hydroxy group of the AHPSE. The resulting monomer can be further neutralized with caustic or other basic material. The reaction is illustrated by the following mechanism:

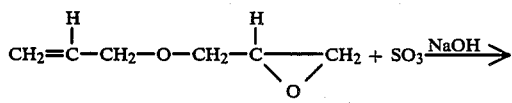

-continued
$$CH_2=CH-CH_2-O-CH_2-CHOH-CH_2-SO_3^-Na^+$$

Similar ring opening reactions can be carried out by using phosphorous acid and its derivatives including phosphorous trichloride to obtain the phosphonic acid substituents.

If orthophosphoric acid ($H_3PO_4$) and its derivatives are used in the ring opening reaction, phosphoric acid ester substituents may be formed in accordance with the mechanism:

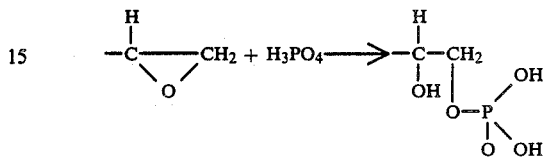

Such reaction is described in U.S. Pat. No. 2,723,971.

Carboxylate functions can be provided on the allyl hydroxy propyl ether monomer via the reaction of allyl alcohol and chloro-$\beta$ hydroxy butanoic acid according to the mechanism:

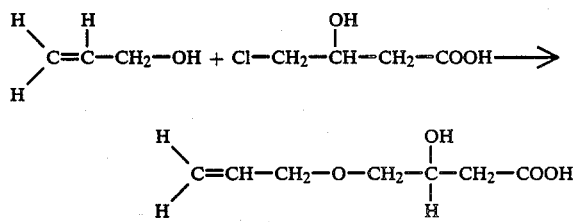

It should be noted that the monomer y (FORMULA I) may itself be allyl glycidyl ether which is commercially available from several sources.

Z in the allyl monomer, (monomer y of FORMULA I) if present, may be hydrogen, hydrogens or any soluble cation or cations which together counterbalance the valence of the anionic moiety X. Suitable cations include Na, $NH_4^+$, Ca, and K. X, when present, may be chosen from the group consisting of $SO_3$, $PO_3$, $PO_4$, and $COO$.

After the desired monomers have been obtained, free radical chain addition polymerization may proceed in accordance with conventional solution polymerization techniques. Polymerization initiators such as persulfate initiators, peroxide initiators, etc. may be used. Preferably the requisite monomers are mixed with water and alcohol (preferably isopropanol). The resulting polymer may be isolated by well-known methods such as distillation, etc. or the polymer may simply be used in its aqueous solution.

It should be mentioned that water soluble terpolymers comprising monomers x and y of FORMULAE I or II may also be prepared for use as deposit control agents and/or corrosion control agents. For instance, AHPSE monomers may be incorporated into a water soluble terpolymer backbone having other repeat units including acrylic acid monomers, alkyl acrylate monomers, methacrylic acid monomers, acrylamide monomers, etc.

The polymers should be added to the aqueous system, for which corrosion inhibiting, and/or deposit control activity is desired, in an amount effective for the purpose. This amount will vary depending upon the particular system for which treatment is desired and will be influenced by factors such as, the area subject to corrosion, pH, temperature, water quantity and the respective concentrations in the water of the potential scale and deposit forming species. For the most part, the polymers will be effective when used at levels of about 0.1–500 parts per million parts of water, and preferably from about 1.0 to 100 parts per million of water contained in the aqueous system to be treated. The polymers may be added directly into the desired water system in a fixed quantity and in the state of an aqueous solution, continuously or intermittently.

The polymers of the present invention are not limited to use in any specific category of water system. For instance, in addition to boiler and cooling water systems, the polymers may also be effectively utilized in scrubber systems and the like wherein corrosion and/or the formation and deposition of scale forming salts is a problem. Other possible environments in which the inventive polymers may be used include heat distribution type sea water desalting apparatus and dust collection systems in iron and steel manufacturing industries and as a dispersant in the pulp and paper processing industries. Also the polymers could be used as mineral beneficiation aids such as in iron ore, phosphate, and potash recovery.

The water soluble polymers of the present invention can also be used with topping agent components in order to enhance the corrosion inhibition and scale controlling properties thereof. For instance the polymers may be used in combination with one or more kinds of compounds selected from the group consisting of inorganic phosphoric acids, phosphonic acid salts, organic phosphoric acid esters, and polyvalent metal salts. Such topping agents may be added to the system in an amount of from about 1 to 500 ppm.

Examples of such inorganic phosphoric acids include condensed phosphoric acids and water soluble salts thereof. The phosphoric acids include an orthophosphoric acid, a primary phosphoric acid and a secondary phosphoric acid. Inorganic condensed phosphoric acids include polyphosphoric acids such as pyrophosphoric acid, tripolyphosphoric acid and the like, metaphosphoric acids such as trimetaphosphoric acid, and tetrametaphosphoric acid.

As to the other phosphonic acid derivatives which are to be added in addition to the polymers of the present invention, there may be mentioned aminopolyphosphonic acids such as aminotrimethylene phosphonic acid, ethylene diaminetetramethylene phosphonic acid and the like, methylene diphosphonic acid, hydroxyethylidene diphosphonic acid, 2-phosphonobutane 1,2,4, tricarboxylic acid, etc.

Exemplary organic phosphoric acid esters which may be combined with the polymers of the present invention include phosphoric acid esters of alkyl alcohols such as methyl phosphoric acid ester, ethyl phosphoric acid ester, etc., phosphoric acid esters of methyl cellosolve and ethyl cellosolve, and phosphoric acid esters of polyoxyalkylated polyhydroxy compounds obtained by adding ethylene oxide to polyhydroxy compounds such as glycerol, mannitol, sorbitol, etc. Other suitable organic phosphoric esters are the phosphoric acid esters of amino alcohols such as mono, di, and tri-ethanol amines.

Inorganic phosphoric acid, phosphonic acid, and organic phosphoric acid esters may be salts, preferably salts of alkali metal, ammonia, amine and so forth.

Exemplary polyvalent metal salts which may be combined with the water soluble polymers of the invention include those capable of dissociating polyvalent metal cations in water such as $Zn^{++}$, $Ni^{++}$, etc., which include zinc chloride, zinc sulfate, nickel sulfate, nickel chloride and so forth.

The water soluble polymers of the present invention may also be used in conjunction with water soluble chromate compounds that are adapted to provide chromate radicals in water solutions. Illustrative water soluble chromate compounds include sodium chromate dihydrate, sodium chromate anhydrous, sodium chromate tetrahydrate, sodium chromate hexahydrate, sodium chromate decahydrate, potassium dichromate, potassium chromate, ammonium dichromate and chromic acid.

In addition, water soluble azole compounds can be used in combination with the water soluble polymers herein disclosed. Such azoles have the formula

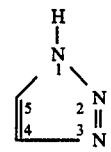

Included within the scope of the invention are N-alkyl substituted 1,2,3-triazole, or a substituted water soluble 1,2,3-triazole where substitution occurs at the 4 and/or 5 position of the ring. The preferred 1,2,3-triazole is 1,2,3-tolyltriazole of the formula

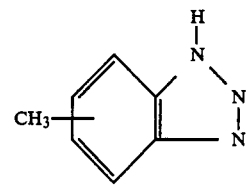

Other exemplary 1,2,3-triazoles include benzotriazole, 4-phenol-1,2,3-triazole, 4-methyl-1,2,3-triazole, 4-ethyl-1,2,3-triazole, 5 methyl-1,2,3-triazole, 5-ethyl-1,2,3-triazole, 5-propyl-1,2,3-triazole, and 5-butyl-1,2,3-triazole. Alkali metal or ammonium salts of these compounds may be used.

Other azole compounds include thiazole compounds of the formula:

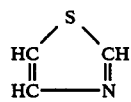

Suitable thiazoles include thiazole, 2-mercaptothiazole, 2-mercaptobenzothiazole, benzothiazole and the like.

The water soluble polymers may also be used in conjunction with molybdates such as, inter alia, sodium molybdate, potassium molybdate, lithium molybdate, ammonium molybdate, etc.

When the water soluble polymer of the invention (FORMULA I) is added to the aqueous system in combination with a topping agent component selected from the group consisting of inorganic phosphoric acids, phosphonic acids, organic phosphoric acids esters, their water-soluble salts (all being referred to hereinafter as phosphoric compounds), polyvalent metal salts, chromates, molybdates, and azoles, a fixed quantity of said polymer may be added separately and in the state of aqueous solution into the system. The water soluble polymers may be added either continuously or intermittently. Alternatively, the polymer may be blended with the above noted topping agent compounds and then added in the state of aqueous solution into the water system either continuously or intermittently. The topping agents are utilized in the usual manner for corrosion and scale preventing purposes. For instance, the phosphoric compounds or polyvalent metal salts may be added to a water system continuously or intermittently to maintain their necessary concentrations.

Generally, the phosphoric compounds should be present in the aqueous system in an amount of about 1–100 ppm (as $PO_4$) or the polyvalent metal salts should be present in an amount of about 1 to 50 ppm (as metal cation).

As is conventional in the art, the phosphoric compounds or polyvalent metal salts may be added, as pretreatment dosages, to the water system in an amount of about 20 to about 500 ppm, and thereafter a small quantity of chemicals may be added, as maintenance dosages.

The polymers may be used in combination with yet other topping agents including corrosion inhibitors for iron, steel, copper, copper alloys or other metals, conventional scale and contamination inhibitors, metal ion sequestering agents, and other conventional water treating agents. Other corrosion inhibitors comprise tungstate, nitrites, borates, silicates, oxycarboxylic acids, amino acids, catechols, aliphatic amino surface active agents, benzotriazole, and mercaptobenzothiazole. Other scale and contamination inhibitors include lignin derivatives, tannic acids, starch, polyacrylic soda, polyacrylic amide, etc. Metal ion sequestering agents include polyamines, such as ethylene diamine, diethylene triamine and the like and polyamino carboxylic acids, such as nitrilo triacetic acid, ethylene diamine tetraacetic acid, and diethylene triamine pentaacetic acid.

EXAMPLES

The invention will now be further described with reference to a number of specific examples which are to be regarded solely as illustrative, and not as restricting the scope of the invention.

EXAMPLE 1

Preparation of Acrylic Acid/Allyl Hydroxylpropyl Sulfonate Ether Copolymer

A suitable reaction flask was equipped with a mechanical agitator, a thermometer, a reflux condenser, a nitrogen inlet and two addition inlets for the initiator and monomer solutions. The flask was charged with 200 g of deionized water and 26 g of isopropanol. The resulting solution was then heated to reflux under a nitrogen blanket. 72 g of acrylic acid (1 mole) and 136 g of 1-propane sulfonic acid, 2-hydroxy-3-(2-propenyl oxy) mono sodium salt [AHPSE] (40%, 0.25 mole) were mixed in a separate flask so as to provide a mixed monomer solution. The mixed monomer solution was then transferred to an addition funnel. An initiator solution containing 27.3% of sodium persulfate in deionized water was prepared separately and sparged with nitrogen. The initiator solution (20 ml) was then added to the reaction flask along with the mixed monomer solution over a period of 2 hours. After this addition, the resulting mixture was heated for 2 more hours at 85 C. and subsequently, 66.5 g of the isopropanol/water solution was stripped off. The reaction mixture was then cooled to less than 40 C. and 60 g of 50% caustic solution was then added.

The structure of the resulting copolymer was verified by Carbon 13 NMR. The polymer solution, after being diluted to 25% solids with water, had a Brookfield viscosity of 14.5 cps at 25 C. It was a stable solution with a slightly yellow color.

EXAMPLE 2

Utilizing both apparatus and procedure similar to that described in Example 1, 200 g of deionized water and 13 g of isopropanol were charged to a reaction flask. The solution was then heated to reflux temperature under a nitrogen blanket. 72 g of acrylic acid and 136 g of AHPSE (40%) were added to a separate flask so as to provide a mixed monomer solution. The mixed monomer solution was then added to the reaction flask along with an initiator solution comprising sodium persulfate over a 2 hour period. The reaction mixture was heated for 2 more hours and subsequently, 36.4 g of isopropanol/water solution was stripped off. The mixture was cooled to lower than 40 C. and 60 g of 50% caustic solution was added.

The resulting polymer solution, after being diluted to 25% with water, had a Brookfield viscosity of 19.8 cps (at 25° C.).

EXAMPLE 3

Utilizing both apparatus and procedure similar to that described in Example 1, 15 g of isopropanol and 228 g of water were added to a reaction flask. 72 g of acrylic acid (1 mole) and 180 g of AHPSE (40% solution, 0.33 mole) were added to an addition funnel so as to provide a mixed monomer solution. The mixed monomer solution was then added to the reaction flask along with a sodium persulfate containing initiator solution over a 2 hour period. One hour after this addition, a solution of t-butyl hydroperoxide (0.2 g in 10 ml of water) was added to the reaction mixture. The mixture was heated for 1 more hour and subsequently, 39.4 g of isopropanol/water solution was stripped off. The mixture was cooled to lower than 40 C. and 60 g of 50% caustic was added.

The resulting copolymer solution, after being diluted to 25% solids, had a Brookfield viscosity of 15.9 cps at 25 C.

EXAMPLE 4

Utilizing the apparatus and procedure described in Example 1, 72 g of acrylic acid (1 mole) and 90.8 g of AHPSE (40%, 0.167 mole) were used for copolymerization. The resulting polymer solution, after being diluted to 25%, had a Brookfield viscosity of 14.5 cps (at 25° C.). The structure of the copolymer was verified by Carbon 13 NMR.

EXAMPLE 5

Utilizing the apparatus and procedure as described in Example 1, 72 g of acrylic acid (1 mole) and 68.1g of AHPSE (40%, 0.125 mole) were used for copolymerization. The resulting polymer solution, after being diluted to 25% had a Brookfield viscosity of 15.1 cps (at 25° C.).

EXAMPLE 6

Apparatus, procedure and reagent charge similar to that described in Example 3 were used, except that this time, AHSE (180 g, 40% solution) was initially charged into a reaction flask along with isopropanol and water. Acrylic acid (72 g) and sodium persulfate solution were then added to the reaction flask over a 2 hour period. The resulting copolymer solution, after isopropanol distillation, caustic addition and water dilution (to 25% solids) had a Brookfield viscosity of 22.5 cps at 25 C.

EXAMPLE 7

Apparatus, procedure and reagent charge similar to that described in Example 4 were used except that this time AHPSE (90.8 g, 40% solution) was charged initially into the reaction flask along with isopropanol and water. Acrylic acid (72 g) and sodium persulfate solution were then added to the reaction mixture over a 2 hour period. The resulting copolymer solution, after isopropanol distillation, caustic addition, and water dilution, (to 25% solids) had a Brookfield viscosity of 15.4 cps (at 25 C.).

Table I hereinbelow presents a summary of the physical properties of the copolymers produced in accordance with Examples 1 through 6.

TABLE I

| Example Number | AA/AHPSE Molar Ratio | Viscosity (Brookfield 25% Soln. 25° C.) | $\overline{Mn}$ | pH |
|---|---|---|---|---|
| 1 | 4:1 | 14.5 | 2,550 | 5.9 |
| 2 | 4:1 | 19.8 | 3,600 | 5.5 |
| 3 | 3:1 | 15.9 | 2,900 | 5.7 |
| 4 | 6:1 | 14.5 | 2,080 | 6.1 |
| 5 | 8:1 | 15.1 | 2,260 | 6.7 |
| 6 | 3:1 | 22.5 | 3,760 | 6.1 |
| 7 | 6:1 | 15.4 | 2,217 | 6.2 |

AA = acrylic acid
AHPSE = allyl hydroxypropyl sulfonate ether; IUPAC 1-propane sulfonic acid, 2-hydroxy-3-(2-propenyl oxy)-mono sodium salt.

Deposit Control Activity

One method of evaluating deposit contorl activity of a material consists of measuring its ability to prevent bulk phase precipitation of a salt at conditions for which the salt would normally precipitate. It is additionally important to recognize that the material being evaluated is tested at "substoichiometeric" concentrations. That is, typical molar ratios of precipitating cation to the material being evaluated are on the order of 20:1 and much greater. Consequently, stoichiomtric sequestration is not the route through which bulk phase precipitation is prevented. This well known phenomenon is also called "threshold" treatment and is widely practiced in water treatment technology for the prevention of scale (salt) deposits from forming on various surfaces. In the results that follow calcium phosphate, calcium carbonate, and calcium sulfate salts commonly found in industrial water systems under various conditions have been selected as precipitants. The polymers of the present invention has been evaluated for their ability to prevent precipitation (i.e., inhibit crystallization) of these salts. Zinc hydroxide and calcium phosphonate precipitation studies were also undertaken as these particular deposit forming species are also commonly encountered as a result of the use of zinc based corrosion prevention treatments and phosphonate containing deposit control treatments. The results are expressed as "percent inhibition", positive values indicate that the stated percentage of precipitate was prevented from being formed. Except as where noted to the contrary, the following conditions, solutions, and testing procedure were utilized to perform the inhibition tests, the results of which are reported herein in Tables II to VIII.

CALCIUM CARBONATE INHIBITION

| Conditions | Solutions |
|---|---|
| pH = 9.0, 8.5 | 3.25 g $CaCl_2 \cdot 2H_2O$/liter DI $H_2O$ |
| T = 70° C. | 2.48 g $Na_2CO_3$/liter DI $H_2O$ |
| 5 hour equilibrium | |
| 105 ppm $Ca^{+2}$ as $CaCO_3$ | |
| 702 ppm $CO_3^{-2}$ | |

Procedure (1) Add 50 ml $CaCl_2 \cdot 2H_2O$ pre-adjusted to pH 9.0.
(2) Add 40 ml of $Na_2HPO_4$ solution.
(3) Add 50 ml $NaCO_3$ pre-adjusted to pH 9.0.
(4) Heat 5 hours at 70° C. water bath. Remove and cool to room temperature.
(5) Filter 5 mls through 0.2μ filters.
(6) Adjust samples to pH 1.0 with conc. HCl ($\approx$ 1 g Conc. HCl).
(7) Allow to stand at least 15 minutes.
(8) Dilute to 50 mls with DI $H_2O$.
(9) Bring pH to 12.0 with NaOH.
(10) Add $Ca^{+2}$ indicator (1 level).
(11) Titrate with EDTA to purple-violet endpoint.

Calculation:

$$\% \text{ Inhibition} = \frac{\text{ml EDTA titrated (treated)} - \text{ml EDTA titrated (control)}}{\text{ml EDTA titrated } (Ca^{+2} \text{ stock)} - \text{ml EDTA titrated (control)}} \times 100$$

CALCIUM PHOSPHATE INHIBITION PROCEDURE

| Conditions | Solutions |
|---|---|
| T = 70° C. | 36.76 $CaCl_2 \cdot 2H_2O$/liter DI $H_2O$ |
| pH = 8.5 | 0.4482 g $Na_2HPO_4$/liter DI $H_2O$ |
| 17 hour equilibration | |
| $Ca^{+2}$ = 250 ppm as $CaCO_3$ | |
| $PO_4^{-3}$ = 6 ppm | |

Procedure (1) To about 1800 ml DI $H_2O$ in a 2 liter volumetric flask, add 20 ml of $CaCl_2 \cdot 2H_2O$ solution followed by 2 drops of conc. HCl.
(2) Add 40 ml of $Na_2HPO_4$ solution.
(3) Bring volume to 2 liters with DI water.
(4) Place 100 ml aliquots of solution in 4 oz glass bottles.
(5) Add treatment.
(6) Adjust pH as desired.
(7) Place in 70° C. water bath and equilibrate for 17 hours.
(8) Remove samples and filter while hot through 0.2μ filters.
(9) Cool to room temperature and take Absorbance measurements using Leitz photometer (640 nm).
Preparation for Leitz
 a. 5 mls filtrate
 b. 10 mls Molybdate Reagent
 c. 1 dipper Stannous Reagent
 d. Swirl 1 minute, pour into Leitz cuvette; wait 1 minute before reading.
(10) Using current calibration curve (Absorbance vs ppm $PO_4^{-3}$) find ppm $PO_4^{-3}$ of each sample.

Calculation:

$$\% \text{ Inhibition} = \frac{\text{ppm } PO_4^{-3} \text{ (treated)} - \text{ppm } PO_4^{-3} \text{ (control)}}{\text{ppm } PO_4^{-3} \text{ (stock)} - \text{ppm } PO_4^{-3} \text{ (Control)}} \times 100$$

CALCIUM SULFATE INHIBITION PROCEDURE

| Conditions | Chemicals |
|---|---|
| pH = 7.0 | $1 \times 10^{-1}$ M $CaCl_2.2H_2O$ |
| T = 50° C. | $1 \times 10^{-1}$ M $Na_2SO_4$ |
| 24 hour equilibration | |
| $Ca^{+2}$ = 2000 ppm | |
| $SO_4^{-2}$ = 4800 ppm | |

Procedure
(1) Add 50 ml of $10^{-1}$ M $CaCl_2.2H_2O$ pre-adjusted to pH 7.0 to a 4 oz. bottle.
(2) Add treatment.
(3) Add 50 ml of $10^{-1}$ M $Na_2SO_4$ preadjusted to 7.0.
(4) Heat samples for 24 hours in a 50° C. water bath.
(5) Cool for 30 minutes, at least.
(6) Filter 5 ml through $0.45\mu$ filters.
(7) Add NaOH to pH 12.0 and dilute to 50 ml with DI $H_2O$.
(8) Add $Ca^{+2}$ indicator (1 level).
(9) Titrate to purple-violet endpoint with EDTA.

Calculation:

% Inhibition =

$$\frac{\text{mls titrant (treated)} - \text{mls titrant (control)}}{\text{mls titrant (}Ca^{+2}\text{ stock)} - \text{mls titrant (control)}} \times 100$$

CALCIUM PHOSPHONATE PRECIPITATION INHIBITION PROCEDURE

Conditions:
Static Beaker Study; 750 ppm $Ca^{+2}$ as $CaCO_3$;
pH = 8.7; T = 158° F.; 18 hour Equilibration Time; 10 ppm
1-hydroxyethylidene 1,1-diphosphonic acid (HEDP)

Experimental

Prepare following solutions:
Stock Sol'n - 2.206 g $CaCl_2.2H_2O$ + 0.033 g HEDP/2 liters.
Treatment - 1,000 ppm active solutions Procedure
(1) To clean 4 oz bottle add 100 ml of stock solution.
(2) Add treatment with stirring.
(3) Adjust pH to 8.7 with a dilute NaOH sol'n.
(4) Place samples in water bath at T = 158° F., for 18 hours, after which time filter aliquot through $0.2\mu$ filter paper.
(5) Analyze filtrate for organic phosphate (TP).

Calculation of % Inhibition $$\% \text{ Inh.} = \frac{\text{ppm TP in Treated Sample} - \text{ppm TP in Untreated Control}}{\text{ppm TP Initial} - \text{ppm TP in Untreated Control}} \times 100$$

ZINC HYDROXIDE INHIBITION PROCEDURE

Conditions
T = 120° F.; Static Beaker Study; Equilibration Time = 18 hours; $Ca^{+2}$ = 170 ppm as $CaCO_3$; $Mg^{+2}$ = 110 ppm as $CaCO_3$; $SiO_2$ = 15 ppm;
$Zn^{+2}$ = 5 ppm; treatment level = 5 ppm active.

Solutions
1000 ppm Treatment Solution
Stock Solution

Preparation of Stock Solution
(1) To approximately 9 liters DI water, add 0.5357 g $Na_2SiO_3.5H_2O$.
(2) Adjust pH 6 with concentrated HCl.
(3) Add 2.4996g $CaCl_2.2H_2O$.
(4) Add 2.7114g $MgSO_4.7H_2O$.
(5) Add 0.1374g $ZnSO_4.H_2O$.
(6) Bring volume to 10 liters with DI water.

Procedure
(1) To 800 ml stock solution, add 4 ml treatment solution.
(2) Adjust pH with dilute NaOH.
(3) As each desired pH is reached, place 100 ml of solution in clean 4 oz. bottle.
(4) Place in water bath at 120° F. and equilibrate for 18 hours.
(5) Remove samples and filter through 0.2 u filter.

-continued
ZINC HYDROXIDE INHIBITION PROCEDURE
(6) Analyze filtrate for soluble zinc.
(7) Measure and record pH of cooled unfiltered solution.

TABLE II $CaCO_3$ Precipitation Inhibition

| | % Inhibition Treatment Concentrations (ppm active) | | | | |
|---|---|---|---|---|---|
| Treatment | 1 | 3 | 5 | 7.5 | 10 |
| Polyacrylic acid MW ≈ 5,000 | 30.0 | 63.2 | 73.7 | 77.9 | 78.9 |
| Acrylic acid/2-hydroxy propylacrylate copolymer Mn ≈ 2,000 AA/HPA molar ratio 3:1 | 1.7 | 45.1 | 56.6 | 65.3 | 42.2 |
| Example 1 Copolymer | 0.0 | 36.4 | 45.1 | 56.6 | 62.4 |
| Example 2 Copolymer | 1.7 | 38.2 | 50.9 | 53.8 | 57.8 |
| Example 3 Copolymer | 1.7 | 30.6 | 42.2 | 48.0 | 45.1 |
| Polyacrylic acid MW ≈ 5,000 | 12.4 | 71.4 | 75.7 | 84.9 | 86.5 |
| Example 4 Copolymer | 10.8 | 56.8 | 68.6 | 75.7 | 75.7 |
| Example 5 Copolymer | 8.1 | 54.1 | 67.6 | 73.0 | 78.4 |

TABLE III $Ca_3(PO_4)_2$ Precipitation Inhibition

| | % Inhibition Treatment Concentrations (ppm active) | | |
|---|---|---|---|
| Treatment | 5 | 10 | 15 |
| Acrylic acid/2-hydroxy propylacrylate copolymer Mn ≈ 2,000; AA/HPA Molar ratio 3:1 | 59.3 | 88.9 | 90.7 |
| Sulfonated styrene/maleic anhydride copolymer MW ≈ 1,500 SS/MA molar ratio 3:1 | 50.0 | 81.5 | 90.7 |
| Example 1 Copolymer | 42.6 | 90.7 | 94.4 |
| Example 2 Copolymer | 48.1 | 90.7 | 100.0 |
| Example 3 Copolymer | 53.7 | 92.6 | 100.0 |
| Acrylic acid/2-hydroxy propylacrylate copolymer Mn ≈ 2,000; AA/HPA molar ratio 3:1 | 31.7 | 87.3 | 87.3 |
| Example 4 Copolymer | 22.2 | 84.1 | 93.7 |
| Example 5 Copolymer | 12.7 | 84.1 | 90.5 |

TABLE IV

Calcium Phosphonate Inhibition

| | % Inhibition Treatment Concentration (ppm active) | | | |
|---|---|---|---|---|
| Treatment | 5 | 10 | 15 | 20 |
| Sulfonated styrene/maleic anhydride copolymer MW ≈ 1,500 SS/MA molar ratio 3:1 | 2.9 | 4.4 | 26.5 | 72.1 |
| Example 1 Copolymer | 0.0 | 0.0 | 17.6 | 76.5 |
| Example 2 Copolymer | 0.0 | 0.0 | 33.8 | 69.1 |
| Example 3 Copolymer | 0.0 | 2.9 | 51.5 | 82.4 |
| Sulfonated styrene/maleic anhydride copolymer MW ≈ 1,500 SS/MA molar ratio 3:1 | 4.2 | 5.6 | 25.4 | 69.0 |
| Example 4 Copolymer | 0.0 | 0.0 | 0.0 | 2.8 |

TABLE IV-continued

Calcium Phosphonate Inhibition

| Treatment | % Inhibition Treatment Concentration (ppm active) | | | |
|---|---|---|---|---|
| | 5 | 10 | 15 | 20 |
| Example 5 Copolymer | 0.0 | 0.0 | 0.0 | 0.0 |

TABLE V

Zinc Hydroxide Inhibition

| Treatment | Final pH | ppm Soluble Zinc after 18 Hours |
|---|---|---|
| No treatment | 7.42 | 3.3 |
| | 7.60 | 1.5 |
| | 8.10 | 0.3 |
| | 8.47 | 0.1 |
| | 8.79 | 0.1 |
| | 9.09 | 0.1 |
| Acrylic acid/2-hydroxy propylacrylate copolymer Mn ≈ 2,000; AA/HPA molar ratio 3:1 | 7.12 | 4.3 |
| | 7.55 | 3.8 |
| | 7.93 | 3.7 |
| | 8.15 | 3.8 |
| | 8.64 | 3.8 |
| | 9.04 | 3.6 |
| Sulfonated styrene/ maleic anhydride copolymer MW ≈ 1,500 SS/MA molar ratio 3:1 | 7.40 | 4.0 |
| | 7.68 | 3.8 |
| | 8.06 | 3.9 |
| | 8.35 | 4.2 |
| | 8.77 | 4.0 |
| | 9.08 | 3.5 |
| Example 1 Copolymer | 7.03 | 4.3 |
| | 7.62 | 4.6 |
| | 7.96 | 4.6 |
| | 8.29 | 4.2 |
| | 8.64 | 4.2 |
| | 8.96 | 4.0 |
| Example 2 Copolymer | 7.12 | 4.2 |
| | 7.64 | 4.6 |
| | 7.90 | 4.0 |
| | 8.29 | 4.5 |
| | 8.57 | 4.0 |
| | 9.10 | 3.7 |
| Example 3 Copolymer | 7.20 | 4.2 |
| | 7.64 | 4.6 |
| | 7.94 | 4.6 |
| | 8.33 | 4.3 |
| | 8.67 | 4.4 |
| | 9.06 | 4.2 |
| No treatment | 7.27 | 3.5 |
| | 7.63 | 1.6 |
| | 8.03 | 0.3 |
| | 8.48 | 0.1 |
| | 8.73 | 0.1 |
| | 9.05 | 0.1 |
| Example 4 Copolymer | 7.22 | 3.7 |
| | 7.65 | 3.8 |
| | 8.02 | 3.7 |
| | 8.43 | 3.4 |
| | 8.73 | 4.1 |
| | 9.05 | 4.1 |
| Example 5 Copolymer | 7.24 | 3.8 |
| | 7.60 | 3.3 |
| | 8.01 | 3.6 |
| | 8.37 | 3.9 |
| | 8.72 | 3.5 |
| | 9.03 | 4.1 |

TABLE VI

$Ca_3(PO_4)_2$ Precipitation Inhibition

| Treatment | % Inhibition Treatment Concentration (ppm active) 10 ppm |
|---|---|
| Acrylic acid/2-hydroxy propylacrylate Mn ≈ 2,000; AA/HPA molar ratio 3:1 | 70.4 |

TABLE VI-continued

$Ca_3(PO_4)_2$ Precipitation Inhibition

| Treatment | % Inhibition Treatment Concentration (ppm active) 10 ppm |
|---|---|
| Example 1 Copolymer | 90.7 |
| Example 2 Copolymer | 94.4 |
| Example 3 Copolymer | 94.4 |

TABLE VIa

$Ca_3(PO_4)_2$ Precipitation Inhibition

| Treatment | Treatment Level (ppm) | % Inhibition |
|---|---|---|
| Example 1 Copolymer | 2.5 | 25.9 |
| Example 1 Copolymer | 5.0 | 46.3 |
| | 10.0 | 90.7 |
| | 20.0 | 100.0 |
| Example 2 Copolymer | 2.5 | 18.5 |
| | 5.0 | 44.4 |
| | 10.0 | 94.4 |
| | 20.0 | 100.0 |
| Example 3 Copolymer | 2.5 | 38.9 |
| | 5.0 | 42.6 |
| | 10.0 | 94.4 |
| | 20.0 | 100.0 |
| Acrylic acid 2-hydroxypropyl acrylate copolymer Mn ≈ 2,000; AA:HPA molar ratio = 3:1 | 2.5 | 31.5 |
| | 5.0 | 44.4 |
| | 10.0 | 70.4 |
| | 20.0 | 98.1 |

TABLE VII

Calcium Carbonate Precipitation Inhibition

| Treatment | Treatment Level (ppm) | % Inhibition |
|---|---|---|
| Example 1 Copolymer | 0.5 | 25.0 |
| | 1.0 | 53.6 |
| | 3.0 | 70.3 |
| | 5.0 | 74.5 |
| Example 2 Copolymer | 0.5 | 27.1 |
| | 1.0 | 55.7 |
| | 3.0 | 63.0 |
| | 5.0 | 71.4 |
| Example 3 Copolymer | 0.5 | 26.6 |
| | 1.0 | 47.9 |
| | 3.0 | 66.7 |
| | 5.0 | 65.6 |
| Polyacrylic acid MW ≈ 5,000 | 1.0 | 31.0 |
| | 3.0 | 61.0 |
| | 5.0 | 59.7 |
| | 10.0 | 66.7 |

TABLE VIII

Calcium Sulfate Inhibition

| Treatment | Treatment Level (ppm) | % Inhibition |
|---|---|---|
| Example 1 Copolymer | 0.5 | 10.4 |
| | 1.0 | 24.3 |
| | 3.0 | 88.4 |
| | 5.0 | 98.6 |
| Example 2 Copolymer | 0.5 | 8.1 |
| | 1.0 | 18.9 |
| | 3.0 | 97.3 |
| | 5.0 | 97.5 |
| Example 3 Copolymer | 0.5 | 7.5 |
| | 1.0 | 16.5 |
| | 3.0 | 92.9 |
| | 5.0 | 97.2 |
| Polyacrylic acid MW ≈ 5,000 | 1.0 | 97.0 |
| | 3.0 | 98.0 |
| | 5.0 | 98.0 |

Ferric Oxide Dispersion

In order to demonstrate the effectiveness of the polymers of the invention in dispersing suspended particulate matter, the following procedure, using $Fe_2O_3$ as suspended solids, was undertaken. Results appear in Table IX. In the results, it is noted that increasing $\Delta\%T$ values indicate better treatment as more particles remain suspended in the aqueous medium.

| $Fe_2O_3$ Dispersion Procedure | |
|---|---|
| Conditions: | Solutions: |
| T = 25° C. | 0.1% solution $Fe_2O_3$ in D.I. $H_2O$ |
| pH = 7.5 | 3.68 g $CaCl_2.2H_2O$/100 ml DI $H_2O$ |
| 200 ppm $Ca^{+2}$ as $CaCO_3$ | |

Procedure
(1) Prepare a suspension of 0.1% $Fe_2O_3$ in DI $H_2O$.
(2) Adjust hardness to 200 ppm $Ca^{+2}$ as $CaCO_3$ using $CaCl_2$. $2H_2O$ solution - 8 ml/1000 ml of $Fe_2O_3$ solution
(3) Using overhead mixer, mix suspension ½ hour at 1000 rpms.
(4) Remove solution to magnetic stirrer and adjust to pH 7.5 (about 20 minutes to stabilize pH).
(5) Return solution to overhead mixer.
(6) Take 90 ml aliquots of suspension and place 4 oz. glass bottle.
(7) Add treatment and DI water to bring total volume to 100 ml.
(8) Cap bottle, invert several times and place on reciprocating shaker at a moderate speed of about 40 spm for ½ hour.
(9) Place on vibration-proof surface and allow to stand 18 hours.
(10) Without disturbing settled phase, pipet the top 40 mls off the sample. Place in a cell and read % T (at 415 nm).
Calculation
$\Delta \% T = \% T \text{ (control)} - \% T \text{ (treated)}$

TABLE IX

| Treatment | Treatment Level (ppm) | $\Delta \% T$ |
|---|---|---|
| Example 1 Copolymer | 2.5 | 7.5 |
| | 5.0 | 20.7 |
| | 10.0 | 21.2 |
| | 20.0 | 20.7 |
| Example 2 Copolymer | 2.5 | 12.0 |
| | 5.0 | 10.0 |
| | 10.0 | 10.2 |
| | 20.0 | 10.7 |

| Treatment | Treatment Level (ppm) | % T |
|---|---|---|
| Example 3 Copolymer | 2.5 | 15.1 |
| | 5.0 | 23.1 |
| | 10.0 | 25.9 |
| | 20.0 | 25.4 |
| Acrylic acid/2-hydroxy propyl acrylate Mn ≈ 2,000 molar ratio AA:HPA = 3:1 | 2.5 | 9.3 |
| | 5.0 | 15.4 |
| | 10.0 | 15.1 |
| | 20.0 | 16.4 |
| | 30.0 | 16.9 |

Recirculator Studies

In order to approximate those conditions experienced in a cooling tower, tests were conducted under recirculator conditions with heat transfer provided.

These conditions closely simulate the environment in a field cooling system. In this test system treated water is circulated by a centrifugal pump through a corroision couppon by-pass into which corrosion coupons are inserted, and past a mild steel AISI-1010) heat exchanger tube contained in a plexiglass block. The inside of the exchanger tube is filed with silicone oil and heated with an electric heater. The temperature of the silicone oil can be regulated. The water velocity past the corrosion coupons and heat exchanger tube can be controlled anywhere from 0 to 4.5 ft/sec.

The pH and temperature of the bulk water are automatically controlled. The treated water is prepared by chemical addition to deionized water. Provisions for continuous make-up and blowdown are made by pumping fresh treated water from supply tanks to the sump, with overflow from the sump serving as blowdown.

Corrosion rates are determined by exposing pre-cleaned and weighed metal specimens for a specified period of time, after which they are removed, cleaned and reweighed. Corrosion rates are calculated by dividing the total coupon weight loss by the number of days of exposure.

The conditions used were: Heat Flux 8000 $BTU/ft^2/hr$; Water Velocity=3 ft/sec; Water Temperature=120° F.; Retention Time=1.3 days; Mild Steel Heat Transfer Surface.

Water Chemistry: 600 ppm Ca as $CaCO_3$; 300 ppm $Mg^{+2}$ as $CaCO_3$; 83 ppm $NaHCO_3$; pH=7.3±0.2.

Treatment: 12.5 ppm active polymer; 3.0 ppm tolyltriazole; 10.5 ppm tetrapotassium pyrophosphate; 15.2 ppm monosodium phosphate; HEDP 4.0 ppm.

The following results were obtained:

TABLE X

| Treatment | Mild Steel Corrosion | Pretreated Mild Steel Corrosion | Admiralty Corrosion | Remarks |
|---|---|---|---|---|
| Example 1 Copolymer | 1.2 mpy | 0.1 mpy | 0.1 mpy | No significant corrosion or deposition on steel surfaces. |
| Example 2 Copolymer | 1.2 mpy | 0.9 mpy | 0.5 mpy | No significant corrosion or deposition on mild steel surfaces. |
| Example 3 Copolymer | 1.1 mpy | 0.8 mpy | 0.5 mpy | No significant corrosion or deposition on mild steel surfaces. |

EXAMPLE 8

Copolymer of Methacrylic Acid and AHPSE

Utilizing both apparatus and procedure similar to that described in Example 1, 228 g. of water and 180 g of AHPSE (40% solution, 0.33 mole) were added to a reaction flask, 86 g. of methacrylic acid (1 mole) and sodium persulfate solution were then separately added to the reaction mixture over a two hour period at 85° C. The resulting polymer solution was further neutralized with 70 g of caustic (50%) and diluted to a 25% solids solution. The final solution had a Brookfield viscosity of 28.2 cps at 25° C. The molecular weight Mn of the copolymer was 3,400.

Boiler Studies

In order to assess the efficacy of the polymers of the present invention in inhibiting scale formation in steam generating systems, research boilers were fitted with two 4,000 watt electrical heater probes, giving 185,000 $BTU/ft^2/hr$ and about 8 Kg/hr steam. The boiler feedwater contained the contaminants and treatment agents given hereinbelow. The boilers were operated for 44 hours per run at an average of 15 cycles of concentration. At the conclusion of each run, the deposits were cleaned from the probes with an acid solution and the deposit densities were then calculated.

Boiler Test Conditions

Condition "A"=sodium sulfite oxygen scavenger, 900 psig, contaminants 4/1/1 ppm Ca/Mg/Fe in feedwater, stoichiometric amount of EDTA added—chelant/polymer program.

Condition "B"=sodium sulfite oxygen scavenger, 900 psig, contaminants 4/1 ppm Ca/Mg in feedwater, phosphate added to produce 30 ppm $PO_4$ as Ca—phosphate precipitation/polymer program.

Condition "C"=hydrazine oxygen scavenger, 1450 psig, contaminant 5 ppm Fe in feedwater, phosphate added to produce 7 ppm $PO_4$ as Ca—coordinated phosphate/pH/polymer.

The results appear hereinbelow in Table XI.

TABLE XI

| Condition | Polymer | Treatment Dosage ppm polymer (actives) | Average Deposit (g/ft$^2$) |
|---|---|---|---|
| A | Polymethacrylic acid Mw 12,000 (sodium salt) | 5 | 0.18 |
| A | Example 8 Copolymer | 5 | 0.19 |
| B | Sulfonated Polystyrene Maleic Anhydride Copolymer MW 3,000-5,000 SSMA (3:1) | 7.5 | 0.23 |
| B | Example 8 Copolymer | 7.5 | 0.23 |
| C | Polymethacrylic acid Mw 12,000 (Sodium Salt) | 5 | 0.93 |
| C | Example 8 Copolymer | 5 | 2.55 |

Discussion

The examples demonstrate that the copolymers of the present invention are effective in inhibiting the formation of those deposits normally encountered in industrial water systems such as cooling and boiler systems. Further, the copolymers are effective in dispersing iron oxide which is sometimes encountered as a troblesome fouling species.

The demonstrated efficacy of the copolymers in inhibiting calcium phosphate, and calcium phosphonate precipitation is very important. For instance, one successfully established cooling water treatment method provides a passivated oxide film on metal surfaces in contact with the aqueous medium via addition of orthophosphate, organo-phosphonate and an acrylic acid/hydroxylated alkyl acrylate copolymer. Details of such method are disclosed in U.S. Pat. No. 4,303,568 (May et al). The entire content of this patent is hereby incorporated by reference. Based upon the deposit control efficacy shown by the instant copolymers, as well as the minimum corrosion rates displayed herein in the recirculator studies, it is thought that the subject copolymers can be substituted for the polymers disclosed in the aforementioned May et al patent so as to provide the important passivated oxide film on the desired metal surfaces.

As the copolymers are effective in inhibiting calcium phosphate formation, they would also be effective in gas scrubbing systems where scrubbing mediums such as sewage treatment effluents contain high phosphate levels. Such systems would have the prerequisite for the formation and deposition of calcium phosphate which is to be avoided. Additional areas of application such as the phosphate production and processing field, fertilizer field, automotive metallic part pretreatment field, etc. will be apparent to those skilled in the art.

The fact that the instant copolymers provide for increased soluble zinc concentrations in solution (Table V) is important in that more zinc is left in the system water so as to provide its well known corrosion protection. Without the use of the copolymers of the present invention, more zinc precipitates in the form of zinc hydroxide, thus leaving less zinc available for its all important anti-corrosion protection. As such, it is postulated that the present copolymers can be successfully employed in zinc-based corrosion protection systems such as those disclosed in U.S. Pat. No. 3,510,436 (Silverstein), the contents of which is hereby incorporated by reference.

The boiler studies demonstrate that a polymethacrylic acid/AHPSE copolymer in accordance with the invention is comparable to the well-known polymethacrylic acid and polysulfonated styrene/maleic anhydride polymeric treatments in inhibiting deposits in boilers. Accordingly, the polymethacrylic acid/AHPSE copolymer of Example 8 is preferred for use in boiler environments.

In a particularly unique aspect of the invention, a high pH, simultaneous corrosion inhibition and scale control protection treatment may be provided in cooling water systems when the preferred water soluble copolymer is used conjointly with a water soluble phosphonate, e.g. HEDP, and a source of $Zn^{++}$ ions. Specifically, the polymer has the formula

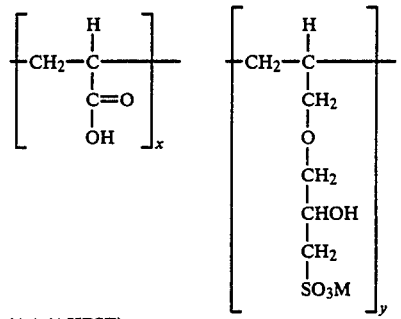

(AA/AHPSE)

Presently, the commercial purposes in such high pH system methods, the copolymer has a molar ratio x:y of from about 3:1 to 6:1 and a molecular weight ($\overline{Mn}$) of around 5,000 to 10,000. The copolymer presently commerically used for this purpose has an x:y molar ratio of 6:1 and a $\overline{Mn}$ of 6,400 to 6,800.

In accordance with these high pH cooling water system programs, the system water is supersaturated with respect to $CaCO_3$. The pH is maintained in a high range (i.e. 7.5–9.0) with a minimum M alkalinity of 150 ppm and a maximum M alkalinity of 400 ppm. Due to such high alkalinity, the system water is not conductive to corrosion but does present a significant calcium carbonate deposition potential. Heretofore, sulfonated styrene/maleic anhydride (SS/MA) copolymers have been successfully employed in such high pH systems that are supersaturated with respect to calcium carbonate. However, substitution of the AA/AHPSE copolymers for the SS/MA copolymers lends even better calcium carbonate scale control to the treatment method. In addition to the superior calcium carbonate inhibition occasioned by use of the AA/AHPSE polymers, they also function to maintain the zinc component of the treatment in soluble ion form so it can perform its intended corrosion inhibiting function even at the high (7.5-9.0) pH range of the treatment method.

The following process parameters are to be employed in the cooling water system;

| pH | 7.5-9.0 |
|---|---|
| M-alk | 150 ppm-400 ppm (as CaCO$_3$) |
| LSI (Langelier Saturation Index-see p 177-178 Betz Handbook of Industrial Water Conditioning, Eighth Edition, 1980) | 1.0-2.5 |
| Phosphonate (e.g. hydroxy ethylidene disphosphonic acid - HEDP) | .2-50 ppm |
| Zinc compound (as Zn$^{++}$ ion) | .1-15 ppm |
| AA/AHPSE copolymer | .5-50 ppm |

As to the zinc compound which is to be employed, exemplary compounds include zinc oxide, zinc sulfate, zinc acetate, zinc chloride, zinc formate, zinc nitrate, zinc borate, zinc chromate, and zinc dichromate may be mentioned.

If desired, addition corrosion protection may be provided by adding between about 1-50 ppm chromate (as Cr$_2$O$_4$) to the cooling water system. As is disclosed in Kahler et al U.S. Pat. No. 2,900,222, acceptable chromate compounds include alkali metal chromates or any water soluble compound that contains hexavalent chromate and provides chromate radicals in water solutions. Illustrative water-soluble chromate compounds include sodium chromate dihydrate, sodium chromate anhydrous, sodium chromate tetrahydrate, sodium chromate hexahydrate, sodium chromate decahydrate, potassium dichromate, potassium chromate, ammonium dichromate and chromic acid.

Use of the AA/AHPSE copolymer in the high pH cooling treatment system also provides significant commerical advantage over the use of acrylic acid/hydroxylated lower alkyl acrylate AA/HLAA copolymers in similar methods, since the latter copolymers cannot be sold in combination with the other treatment components in a stable one drum product. Use of the AA/AHPSE copolymers allow for such commerically desirable one drum packaging and sale.

In addition to the other high pH cooling water system treatment components (i.e., AA/AHPSE copolymer, Zn$^{+2}$, HEDP, optional chromate), especially in those cooling systems comprising copper, such as admirality, binary brasses, binary bronzes, etc., it is desirable to add from about 0.2 to 30 ppm of an azole compounds. Exemplary azole compounds include 1,2,3-tolytriazole; benzotriazole; 4-phenol-1,2,3-triazole; 4-methyl-1,2,3-triazole; -ethyl-1,2,3-triazole; 5-methyl-1,2,3-triazole; 5-ethyl-1,2,3-triazole; 5-propyl-1,2,3-triazole; and 5-butyl-1,2,3-triazole.

Other exemplary azole copper corrosion inhibitors comprise thiazole, 2-mercaptothiazole, benzothiazole and the like.

Exemplary single drum AA/AHPSE containing compositions for use in the high pH cooling water system program comprise aqueous solutions of

| AA/AHPSE | 3-10 wt % |
|---|---|
| Zn compound | .3-2 wt % |
| (as Zn$^{2+}$) | |
| Phosphonate | .5-4 wt % |
| Azole (when present) | .75-2 wt % |
| Chromate (when present) | 5-10 wt % |
| Remainder water | |

In order to demonstrate the efficacy of the AA-/AHPSE copolymers in simultaneously inhibiting corrosion and scale formation at high pHs, recirculator tests, similar to those reported in Table X hereinabove, were run under the high pH process parameters referred to above. Exact water chemistry and test results are reported in Table XII.

TABLE XII

| Test Conditions: | 120 F bulk water temperature, 1.4 ft/sec water velocity (2 gpm), pH 8.5, 15600 Btu/hr-ft$^2$ heat flux, 160 F skin temperature, 4-5 day test, 1.3 day retention time | |
|---|---|---|
| Test Water: | 600 ppm Ca$^{+2}$ as CaCO$_3$, 200 ppm Mg$^{+2}$ as CaCO$_3$, 357 ppm NaHCO$_3$ M-alk = 220-250 ppm (as CaCO$_3$) | |
| Treatment: | 15 ppm AA/AHPSE (AA:AHPSE 6:1, $\overline{M}n$ = 6800) 6 ppm HEDP as PO$_4$ 3 ppm TTA (Tolytriazole) 2 ppm Zinc | |
| | | (mpy) |
| Corrosion Rates: | LCS | 0.7 |
| | ADM | 0.5 |
| Coupon/Heat Exchange Tube Appearance: | Coupons clean. Tube predominantly clean with streaks of corrosion products and a small patch of thin, white deposit on back of tube. | |

LCS = Low Carbon Steel
ADM = Admiralty Brass

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method for simultaneously inhibiting corrosion and scale formation including calcium carbonate in a cooling water system, comprising
    (a) maintaining the pH of said cooling water system within the pH range of about 7.5 to about 9.0;
    (b) maintaining the cooling water system in a state of supersaturation with respect to calcium carbonate;
    (c) adding from about 0.5-50 ppm of a water soluble acylic acid/allyhydroxylsulfonate ether copolymer or water soluble salt form thereof to said cooling water system, based upon one million parts of water in said system; said copolymer having the formula

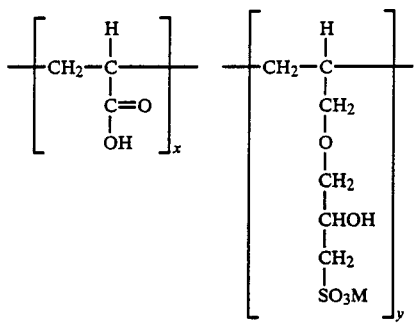

wherein M is a water soluble cation and the molar ratio x:y being from about 10:1 to 1:5;

(d) adding to said cooling water system from about 0.2-50 ppm of water soluble phosphonate compound to cooling water; and (e) adding to said cooling water system from about 0.1-15 ppm of a zinc compound adapted to liberate $Zn^{2+}$ ions in water.

2. A method as recited in claim 1 further comprising maintaining the M-alkalinity of said cooling water system within the range of from 150 ppm –400 ppm (as $CaCO_3$) and maintaining the Langeliere Saturation Index of said cooling water system within the range of from about 1.0 to 2.5.

3. A method as recited in claim 1 wherein said copolymer has a molar ratio x:y of from about 3:1-6:1.

4. A method as recited in claim 1 wherein said phosphate comprises hydroxyethylidene diphosphonic acid.

5. A method as recited in claim 1 further comprising adding from about 1-50 ppm (as $Cr_2O_4$) of a water soluble chromate compound containing hexavalent chromium ions.

6. A method and recited in claim 1 further comprising adding from about 0.2-30 ppm of an azole compound to said cooling water system.

* * * * *